US010563772B2

United States Patent
Trivedi et al.

(10) Patent No.: US 10,563,772 B2
(45) Date of Patent: Feb. 18, 2020

(54) SEAL ASSEMBLY AND AN ASSOCIATED METHOD THEREOF

(71) Applicant: GENERAL ELECTRIC COMPANY, Schenectady, NY (US)

(72) Inventors: Deepak Trivedi, Halfmoon, NY (US); Christopher Edward Wolfe, Niskayuna, NY (US); Nathan EvanMcCurdy Gibson, West Chester, OH (US); Brian Joseph Prenger, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/810,183

(22) Filed: Nov. 13, 2017

(65) Prior Publication Data

US 2019/0145522 A1 May 16, 2019

(51) Int. Cl.
| | |
|---|---|
| *F16J 15/36* | (2006.01) |
| *F16J 15/34* | (2006.01) |
| *H02K 5/10* | (2006.01) |
| *H02K 5/24* | (2006.01) |

(52) U.S. Cl.
CPC ............ *F16J 15/3412* (2013.01); *H02K 5/10* (2013.01); *H02K 5/24* (2013.01)

(58) Field of Classification Search
CPC ................................ F16J 15/44; F16J 15/445
See application file for complete search history.

(56) References Cited

U.S. PATENT DOCUMENTS

| | | | | |
|---|---|---|---|---|
| 2,890,901 | A | * | 6/1959 | Martin ..................... F16J 15/36 277/373 |
| 3,372,076 | A | * | 3/1968 | Wilkinson ............... F16J 15/36 138/121 |
| 4,251,986 | A | | 2/1981 | Thompson et al. |
| 5,553,834 | A | | 9/1996 | Je et al. |
| 5,975,537 | A | | 11/1999 | Turnquist et al. |
| 6,062,548 | A | | 5/2000 | Nagao et al. |
| 6,676,369 | B2 | | 1/2004 | Brauer et al. |

(Continued)

OTHER PUBLICATIONS

Munson et al., "Development of Film Riding Face Seals for a Gas Turbine Engine", Tribology Transactions, vol. 35, Issue: 1, pp. 65-70, Mar. 25, 2008.

(Continued)

*Primary Examiner* — Gilbert Y Lee
(74) *Attorney, Agent, or Firm* — Dority & Manning, P.A.

(57) ABSTRACT

A seal assembly, for example, a face seal assembly for a machine such as a turbomachine, and an associated method of operating the seal assembly in the machine are disclosed. The seal assembly includes a rotatable seal component, a non-rotatable seal component, and a plurality of pairs of flexures. The non-rotatable seal component is disposed facing the rotatable seal component. The plurality of pairs of flexures is spaced apart from each other along a circumferential direction of the seal assembly. Each pair of the plurality of pairs of flexures includes a first flexure and a second flexure disposed in a stressed condition such that a portion of the first flexure and a portion of the second flexure are in contact with each other. Further, an end of the first flexure and an end of the second flexure are coupled to each other and to the non-rotatable seal component.

20 Claims, 8 Drawing Sheets

(56) References Cited

U.S. PATENT DOCUMENTS

| | | |
|---|---|---|
| 6,682,219 B2 | 1/2004 | Alam et al. |
| 8,167,545 B2 | 5/2012 | Glahn et al. |
| 9,359,908 B2 | 6/2016 | Bidkar et al. |
| 2010/0295220 A1 | 11/2010 | Hotta et al. |
| 2012/0251290 A1 | 10/2012 | Turnquist et al. |
| 2014/0062026 A1 | 3/2014 | Davis et al. |

OTHER PUBLICATIONS

Ishida et al., "Vibration Suppression of Rotating Machinery Utilizing Discontinuous Spring Characteristics (Stationary and Nonstationary Vibrations)", Journal of Vibration and Acoustics, vol. 130, Issue: 3, pp. 1-7, Apr. 3, 2008.

* cited by examiner

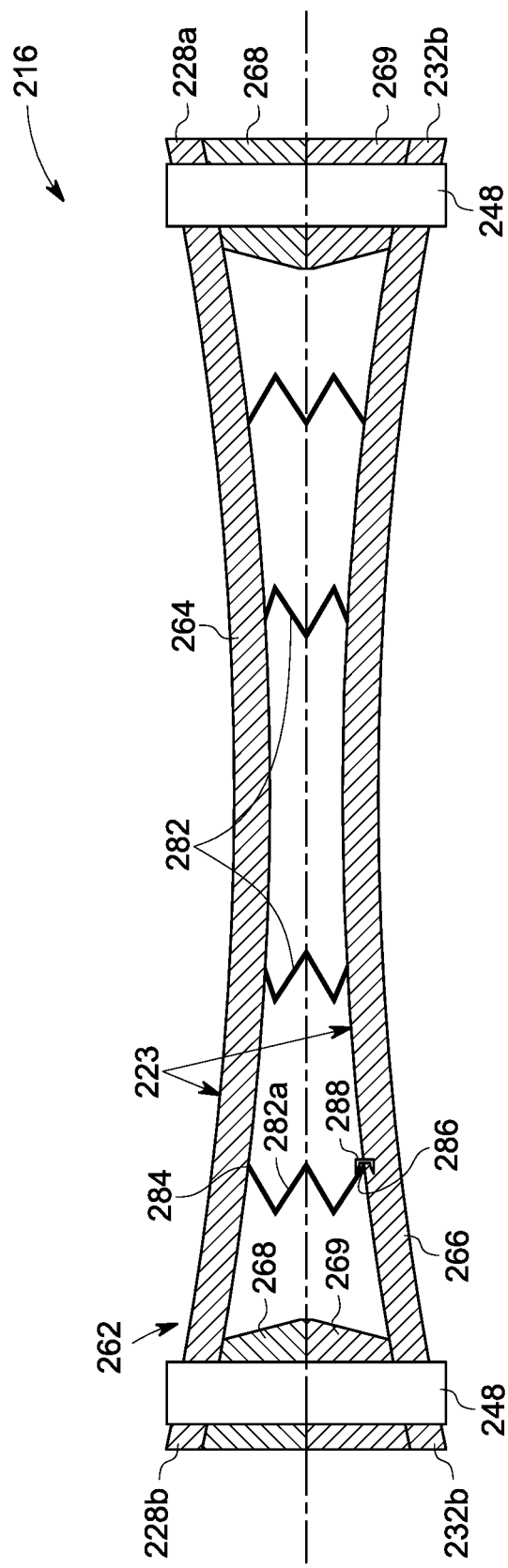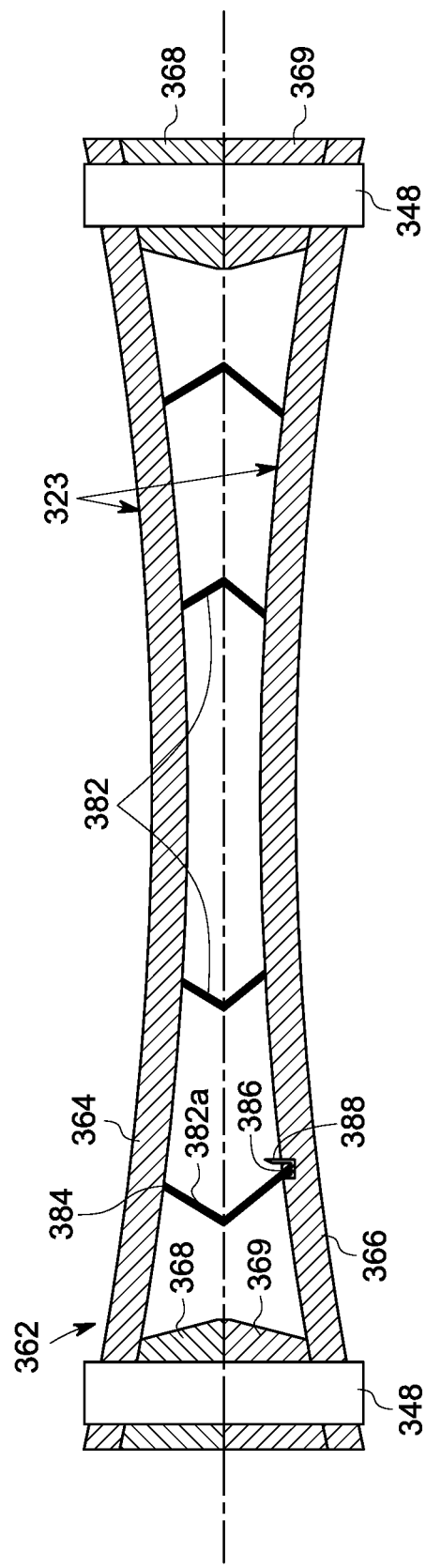

SEAL ASSEMBLY AND AN ASSOCIATED METHOD THEREOF

BACKGROUND

Embodiments of the present specification relate generally to a seal assembly for a machine, and more particularly to a damped biasing member for the seal assembly and an associated method thereof.

In a seal assembly, for example, a face seal assembly, a stator seal component is coupled to a stator via a driving member. The stator seal component is moved along an axial direction of the face seal assembly by a plurality of biasing members such as helical springs disposed in the driving member. During operation, the stator seal component maintains a clearance from a rotor seal component of the face seal assembly. Generally, the stator seal component includes a tongue and the driving member has a groove to enable the tongue to slide along the groove for moving the stator seal component along the axial direction. The groove may be clogged with dust particles during a period of use, thereby obstructing/limiting the axial movement of the stator seal component. The use of helical springs may further limit a span of the axial movement of the stator seal component. Further, the helical springs may either respond excessively or moderately to vibrations, thereby failing to efficiently attenuate vibrations, resulting in quick wear of the stator and/or rotor seal components.

BRIEF DESCRIPTION

In accordance with aspects of the present specification, a seal assembly is disclosed. The seal assembly includes a rotatable seal component, a non-rotatable seal component, and a plurality of pairs of flexures. The non-rotatable seal component is disposed facing the rotatable seal component. The plurality of pairs of flexures is spaced apart from each other along a circumferential direction of the seal assembly. Each pair of the plurality of pairs of flexures includes a first flexure and a second flexure disposed in a stressed condition such that a portion of the first flexure and a portion of the second flexure are in contact with each other. Further, an end of the first flexure and an end of the second flexure are coupled to each other and to the non-rotatable seal component.

In accordance with another aspect of the present specification, a machine is disclosed. The machine includes a stator housing, a rotor, and a seal assembly such as a face seal assembly. The rotor is disposed in the stator housing. The seal assembly is disposed between the stator housing and the rotor. The seal assembly includes a rotatable seal component, a non-rotatable seal component, and a plurality of pairs of flexures. The rotatable seal component is coupled to the rotor. The non-rotatable seal component is disposed facing the rotatable seal component. The plurality of pairs of flexures is disposed spaced apart from each other along a circumferential direction of the seal assembly. Each pair of the plurality of pairs of flexures includes a first flexure and a second flexure disposed in a stressed condition such that a portion of the first flexure and a portion of the second flexure are in contact with each other. Further, a first end of the first flexure and a first end of the second flexure are coupled to each other and to the non-rotatable seal component. Similarly, a second end of the first flexure and a second end of the second flexure are coupled to each other and to the stator housing.

In accordance with yet another aspect of the present specification, a method of operating a seal assembly is disclosed. The method involves driving a rotatable seal component coupled to a rotor disposed inside a stator housing. The method further involves injecting a pressurized fluid via a non-rotatable seal component against the rotatable seal component and forming a layer of the pressurized fluid and a process fluid in a clearance defined between the rotatable seal component and the non-rotatable seal component. Further, the method involves regulating a flow of a portion of the process fluid through the clearance. Moreover, the method involves moving the non-rotatable seal component along an axial direction relative to the rotatable seal component, using a plurality of pairs of flexures. Each pair of the plurality of pairs of flexures includes a first flexure and a second flexure disposed in a stressed condition such that a portion of the first flexure and a portion of the second flexure are in contact with each other. Further, a first end of the first flexure and a first end of the second flexure are coupled to each other and to the non-rotatable seal component, and a second end of the first flexure and a second end of the second flexure are coupled to each other and to the stator housing. Further, the method involves adjusting movement of the non-rotatable seal component, using the plurality of pairs of flexures, and the layer of the pressurized fluid and the process fluid to maintain the clearance between the non-rotatable seal component and the rotatable seal component. The method further involves damping vibrations of the non-rotatable seal component and the stator housing by biasing the first flexure and the second flexure against each other.

DRAWINGS

These and other features and aspects of embodiments of the present invention will become better understood when the following detailed description is read with reference to the accompanying drawings in which like characters represent like parts throughout the drawings, wherein:

FIG. 6 is a top view of a portion of a seal assembly, in accordance with aspects of the present specification;

FIG. 7 is a top view of a portion of a seal assembly, in accordance with aspects of the present specification;

DETAILED DESCRIPTION

Figure 1:
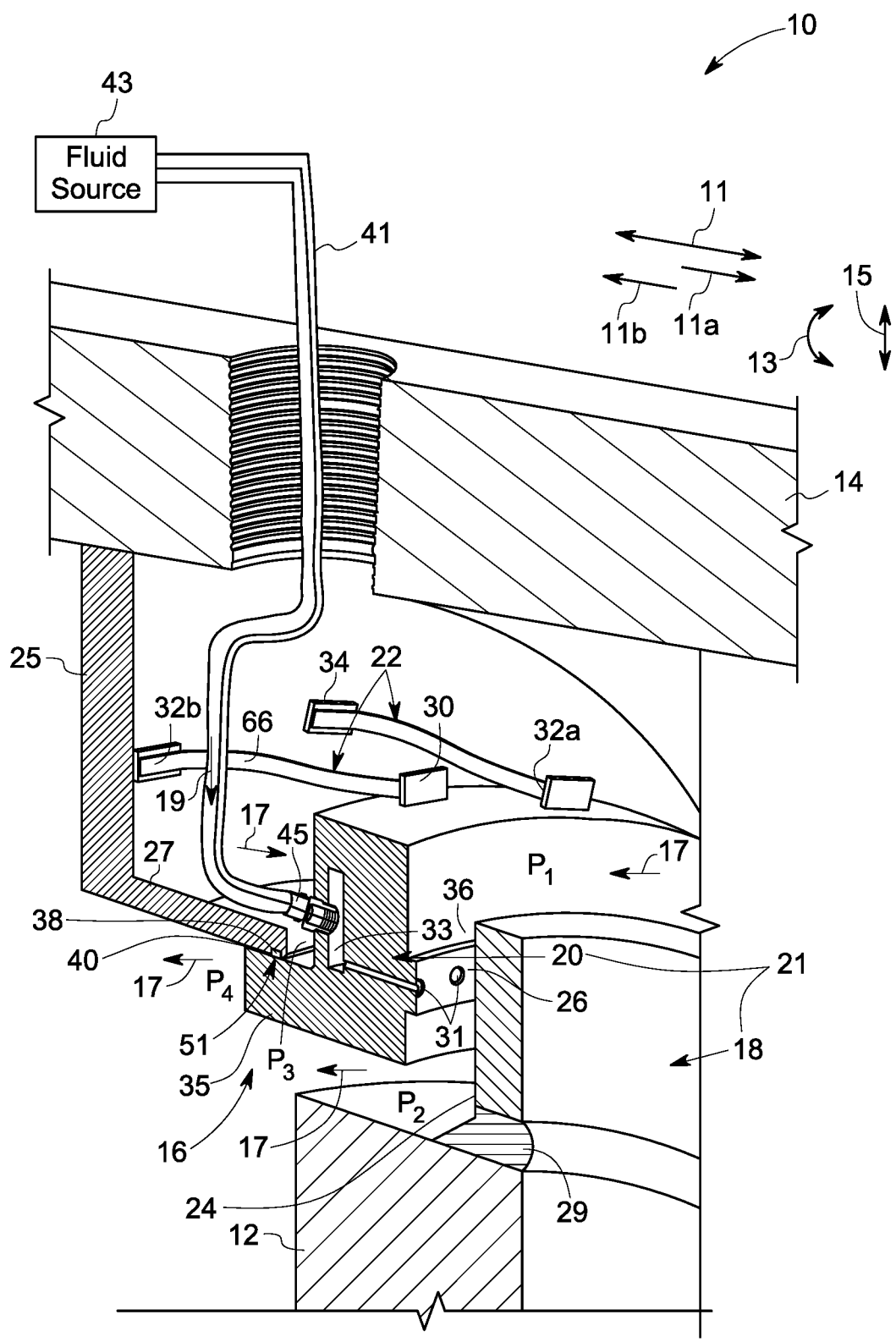
FIG. 1 is a partial perspective view of a portion of a machine including a stator, a rotor, and a seal assembly, in accordance with aspects of the present specification.

Embodiments discussed herein disclose a seal assembly, for example, a face seal assembly for a machine such as a turbomachine. In some embodiments, the turbomachine may include, but not limited to, a gas turbine, a steam turbine, a supercritical carbon dioxide turbine, a turbo compressor, a hydro turbine, and the like. The seal assembly includes a rotatable seal component, a non-rotatable seal component, and a plurality of pairs of flexures. In some embodiments, the rotatable seal component and the non-rotatable seal component may be collectively referred to as a "primary seal." The plurality of pairs of flexures is disposed spaced apart from each other along a circumferential direction of the seal assembly. Each pair of the plurality of pairs of flexures includes a first flexure and a second flexure disposed in a stressed condition such that a portion of the first flexure and a portion of the second flexure are in contact with each other. It should be noted herein that the term "stressed condition" refers to a bent condition of the first and second flexures along mutually opposite directions. For example, the first flexure is bent inwardly and the second flexure is bent outwardly such that a portion of the first flexure and a portion of the second flexure are in contact with each other. Further, an end of the first flexure and an end of the second flexure are coupled to each other and to the non-rotatable seal component. In certain embodiments, the plurality of pairs of flexures are configured to move the non-rotatable seal component along an axial direction of the seal assembly and damp vibrations by biasing the first and second flexures against each other.

In one embodiment, a seal assembly is disposed between a stator housing and a rotor of a machine such as a turbomachine. The rotatable seal component is coupled to the rotor. A first end of the first flexure and a first end of the second flexure are coupled to each other and to the non-rotatable seal component. A second end of the first flexure and a second end of the second flexure are coupled to each other and to the stator housing. The non-rotatable seal component is disposed facing the rotatable seal component to define a clearance (i.e., a first clearance) therebetween. Also, the non-rotatable seal component further includes a recess for holding a secondary seal. The non-rotatable seal component is disposed facing the stator housing to define a second clearance there between.

In certain embodiments, the seal assembly further includes a plurality of third flexures. In such embodiments, at least one third flexure of the plurality of third flexures is disposed between the first and second flexures. Further, the seal assembly may include a plurality of first wedge washers, a plurality of second wedge washers, and a plurality of fasteners. In such embodiments, the plurality of first wedge washers is disposed between the first flexure and the at least one third flexure. The plurality of second wedge washers is disposed between the second flexure and the at least one third flexure. The first flexure and the second flexure are coupled to each other via the plurality of fasteners extending through the plurality of first and second wedge washers and the at least one third flexure.

During operation, the first and second flexures are configured to adjust movement of the non-rotatable seal component to maintain the first clearance between the non-rotatable seal component the rotatable seal component. Further, the first and second flexures are configured to damp the vibrations of the non-rotatable seal component and the stator housing. In some other embodiments, at least one third flexure of the plurality of third flexures is configured to further damp the vibrations of the non-rotatable seal component and the stator housing. In one embodiment, at least one flexure of the first flexure, the second flexure, and the at least one third flexure is a leaf spring. In another embodiment, one flexure of the plurality of third flexures is at least one of a bellow spring, a W-shaped spring, and a V-shaped spring. In one embodiment, at least one flexure of the plurality of first flexures, the plurality of second flexures, and the at least one third flexure includes a truss-like structure to regulate an axial stiffness of the damped biasing members. A portion of each of the first flexure, the second flexure, and the at least one third flexure rub against each other resulting in dissipation of heat from the non-rotatable seal component. In some embodiments, the portion of each of the first flexure, the second flexure, and the at least one third flexure is provided with a wear resistant coating.

FIG. 1 illustrates a partial perspective view of a portion of a machine 10, in accordance with aspects of the present specification. The machine 10 includes a rotor 12, a stator housing 14, and a seal assembly 16 such as a face seal assembly disposed between the stator housing 14 and the rotor 12. In certain embodiments, the seal assembly 16 is used to control leakage of a process fluid 17 between regions "$P_1$," "$P_3$" of relatively high pressure to regions "$P_2$," "$P_4$" of relatively low pressure. In the illustrated embodiment, the machine 10 is a gas turbine engine and the seal assembly 16 is a compressor discharge pressure seal assembly disposed between the rotor 12 and the stator housing 14. The rotor 12 is a core shaft and the stator housing 14 is a diffuser casing. Although the gas turbine engine 10 is illustrated, the seal assembly 16 may be used in other applications where a self-adjusting seal is required. In some embodiments, the machine 10 may be a centrifugal compressor, a steam turbine, a gas turbine, an electric generator, and the like. It may also be noted that the aspects of the present specification are not limited to rotary machines and may be associated with other type of machines subjected to a fluid pressure drop during machine operation.

The machine 10 further includes a stator adaptor 25 coupled to the stator housing 14. In certain embodiments, the stator adaptor 25 extends along a circumferential direction 13 of the machine 10. In the illustrated embodiment, the stator adaptor 25 has an L-shaped profile having a projected end portion 27 extending towards the seal assembly 16. The stator housing 14 extends along an axial direction 11 of the machine 10. The rotor 12 includes an extended portion 29 protruding along a radial direction 15 of the machine 10. In certain embodiments, a rotatable seal component 18 and the rotor 12 are coupled to each other via the extended portion 29. In some other embodiments, the rotatable seal component 18 and the rotor 12 are integrated to form a monolithic component.

The seal assembly 16 includes a primary seal 21, a plurality of pairs of biasing members such as a plurality of pairs of flexures 22 disposed about the axial direction 11, and a secondary seal 51. In some embodiments, the primary seal 21 includes the rotatable seal component 18 and a non-rotatable seal component 20. The rotatable seal component 18 is coupled to an end portion of the extended portion 29. The rotatable seal component 18 includes a rotor bearing face 24. In one embodiment, the rotor bearing face 24 includes a plurality of hydrodynamic elements (not shown in FIG. 1) disposed spaced apart from each other along the circumferential direction 13. The non-rotatable seal component 20 includes a stator bearing face 26 and a plurality of isolated hydrostatic ports 31 (only two isolated hydrostatic port 31 are shown in FIG. 1) extending from a pressure cavity 33 to the stator bearing face 26. In the illustrated embodiment, the non-rotatable seal component 20 has an L-shaped profile having a projected end portion 35 extending away from the stator bearing face 26. In the illustrated embodiment, the machine 10 further includes a fluid supply tube 41 having a first end coupled to a fluid source 43 and a second end coupled to the pressure cavity 33 via a tube connector 45. In the illustrated embodiment, the fluid source 43 is disposed outside the machine 10 and the fluid supply tube 41 extends through the stator housing 14. In one embodiment, the fluid source 43 may be a storage tank used for storing a pressurized fluid 19. The fluid source 43 is further used to supply the pressurized fluid 19 to the pressure cavity 33 through the fluid supply tube 41. In one embodiment, the fluid supply tube 41 may be a flexible pipe or a flexible conduit and the pressurized fluid 19 may be air. In some other embodiments, the pressurized fluid 19 may be carbon dioxide, nitrogen, steam, and the like. In one embodiment, the machine 10 may further include a pressure-control device coupled to the fluid supply tube 41. The pressure-control device may be a fluid pump used to increase a pressure of the pressurized fluid 19 before supplying the pressurized fluid 19 to the pressure cavity 33 through the fluid supply tube 41.

The non-rotatable seal component 20 is coupled to the stator housing 14 via the stator adaptor 25 and the plurality of pairs of flexures 22. In one embodiment, each of the plurality of pairs of flexures 22 includes a first flexure (not shown in FIG. 1) and a second flexure 66 disposed in a stressed condition such that a portion of the first flexure and a portion of the second flexure 66 are in contact with each other. In the illustrated embodiment, only the second flexure 66 is shown. A first end of the first flexure and a first end 32a of the second flexure 66 are coupled to each other and to the non-rotatable seal component 20 via a first coupling member, for example, a grooved beam 30. Similarly, a second end of the first flexure and a second end 32b of the second flexure 66 are coupled to each other and to the stator adaptor 25 via a second coupling member, for example, a grooved flange 34. In certain embodiments, the plurality of pairs of flexures 22 is configured to move the non-rotatable seal component 20 along the axial direction 11. Specifically, the plurality of pairs of flexures 22 is configured to limit the movement of the non-rotatable seal component 20 along the radial direction 15.

The seal assembly 16 is disposed between the stator housing 14 and the rotor 12 such that a clearance 36 (hereinafter also referred to as a "first clearance") is established between the seal assembly 16 and the rotor 12. Specifically, the non-rotatable seal component 20 is disposed facing the rotatable seal component 18 such that the clearance 36 is defined there between the stator bearing face 26 and the rotor bearing face 24. In certain embodiments, the rotatable seal component 18 and the non-rotatable seal component 20 are used to regulate a flow of a portion (i.e., a first portion) of the process fluid 17 through the clearance 36. In one embodiment, the illustrated portion of the machine 10 is an end packing area of a compressor. As used herein, the term "end packing" refers to a downstream end of the rotor 12, where the seal assembly 16 is an interface between the rotor 12 and the stator housing 14.

The non-rotatable seal component 20 is slidably coupled to the stator adaptor 25 such that the projected end portion 35 of the non-rotatable seal component 20 slidably contacts the projected end portion 27 of the stator adaptor 25. The projected end portion 35 of the non-rotatable seal component 20 includes a recess 38 disposed facing the projected end portion 27 of the stator adaptor 25 such that a clearance 40 (hereinafter also referred to as "second clearance") is defined therebetween. In certain embodiments, the seal assembly 16 includes the secondary seal 51 disposed in the recess 38 and configured to regulate a flow of a second portion of the process fluid 17 through the clearance 40. In one embodiment, the secondary seal 51 is an O-ring. In certain embodiments, the secondary seal 51 is a C-shaped seal. In some embodiments, the process fluid 17 may be carbon dioxide. In the illustrated embodiment, the first flexure and the second flexure 66 are leaf springs.

During operation, the plurality of pairs of flexures 22 is configured to move the seal assembly 16 along the axial direction 11. In one or more embodiments, the stator bearing face 26 and the rotor bearing face 24 may be in contact with each other during a stationary condition of the machine 10. The seal assembly 16 is used to regulate a leakage flow of the process fluid 17 from the regions "$P_1$," "$P_3$" of relatively high pressure to the regions "$P_2$," "$P_4$" of relatively low pressure. The plurality of pairs of flexures 22 exerts either an opening force or a closing force on the non-rotatable seal component 20 to move the non-rotatable seal component 20 along a first axial direction 11a or a second axial direction 11b opposite to the first axial direction 11a relative to the rotatable seal component 18. Specifically, the seal assembly 16 generates the closing force by pushing the first end of the first flexure and the first end 32a of the second flexure 66 and thereby moving the non-rotatable seal component 20 along the first axial direction 11a. Similarly, the seal assembly 16 generates the opening force by pulling the first end of the first flexure and the first end 32a of the second flexure 66, and thereby retracting the non-rotatable seal component 20 along the second axial direction 11b. Such a movement of the non-rotatable seal component 20 enables the seal assembly 16 to track an axial movement of the rotor 12. Further, the first flexure and the second flexure 66 of each of the plurality of pairs of flexures 22 bias against each other to damp the vibrations or thermal expansion of components such as the non-rotatable seal component 20 and the stator housing 14.

In some embodiments, the non-rotatable seal component 20 may be in contact with the rotatable seal component 18 at a zero-speed operating condition (i.e., stationary condition) of the machine 10. At the zero-speed operating condition, the rotor 12 may not generate enough separating force to move the stator bearing face 26 away from the rotor bearing face 24. As the speed of the rotor 12 increases, the plurality of hydrodynamic elements generates an opening force to move the stator bearing face 26 away from the rotor bearing face 24 and a layer (i.e., a thin-film) of the process fluid 17 is produced along the clearance 36. Then, the plurality of isolated hydrostatic ports 31 injects the pressurized fluid 19 against the rotor bearing face 24 to generate the separating force (i.e., opening force) which is adequate to further move the stator bearing face 26 away from the rotor bearing face 24 and produce a relatively thick fluid-film of the process fluid 17 and the pressurized fluid 19 between the faces 24, 26. The thick-film regulates a flow of the first portion of the process fluid 17 from the region "$P_1$" of high pressure to the region "$P_2$" of low pressure through the clearance 36. Further, the first flexure and the second flexure 66 of each of the plurality of pairs of flexures 22 maintain the clearance 36 between the non-rotatable seal component 20 and the rotatable seal component 18 by adjusting the opening and closing forces based on the axial movement of the rotor 12. The first flexure and the second flexure 66 of the plurality of pairs of flexures 22 bias against each other along the circumferential direction 13 to damp the vibrations or thermal expansion of the components of the machine 10. The secondary seal 51 regulates a flow of the second portion of the process fluid 17 from the region "$P_3$" of high pressure to the region "$P_4$" of low pressure through the clearance 40.

In some other embodiments, at the zero-speed operating condition of the machine 10, the plurality of isolated hydrostatic ports 31 may be used initially to inject the pressurized fluid 19 to move the stator bearing face 26 away from the rotor bearing face 24. For example, at the zero-speed operating condition, the plurality of isolated hydrostatic ports 31 injects the pressurized fluid 19 against the rotor bearing face 24 to generate the separating force which is adequate to move the stator bearing face 26 away from the rotor bearing face 24. The pressurized fluid 19 produces a thin-film along the clearance 36 between the rotor bearing face 24 and the stator bearing face 26. As a result, the faces 24, 26 of the rotatable seal component 18 and non-rotatable seal component 20 are prevented from rubbing against each other. When a speed of the rotor 12 is increased, the plurality of hydrodynamic elements disposed on the rotor bearing face 24 is further used to move the stator bearing face 26 away from the rotor bearing face 24 and produce a relatively thick fluid-film of the pressurized fluid 19 and the process fluid 17 between the faces 24, 26.

Conventionally, the stator seal component includes a tongue and a driving member has a groove to enable the tongue to slide along the groove for moving the stator seal component along the axial direction. The groove may be clogged with dust particles over a period of use, thereby obstructing/limiting the axial movement of the stator seal component. In accordance with the exemplary embodiment of FIG. 1, the seal assembly 16 does not have a groove and a tongue, thereby obviating the problems associated with dust accumulation discussed with reference to the tongue and groove mechanism of a conventional seal assembly. Further, the use of leaf springs does not limit the axial movement of the non-rotatable seal component 20. Also, the first flexure and the second flexure 66 damps the generated vibrations and/or thermal expansion of associated components.

Figure 2:
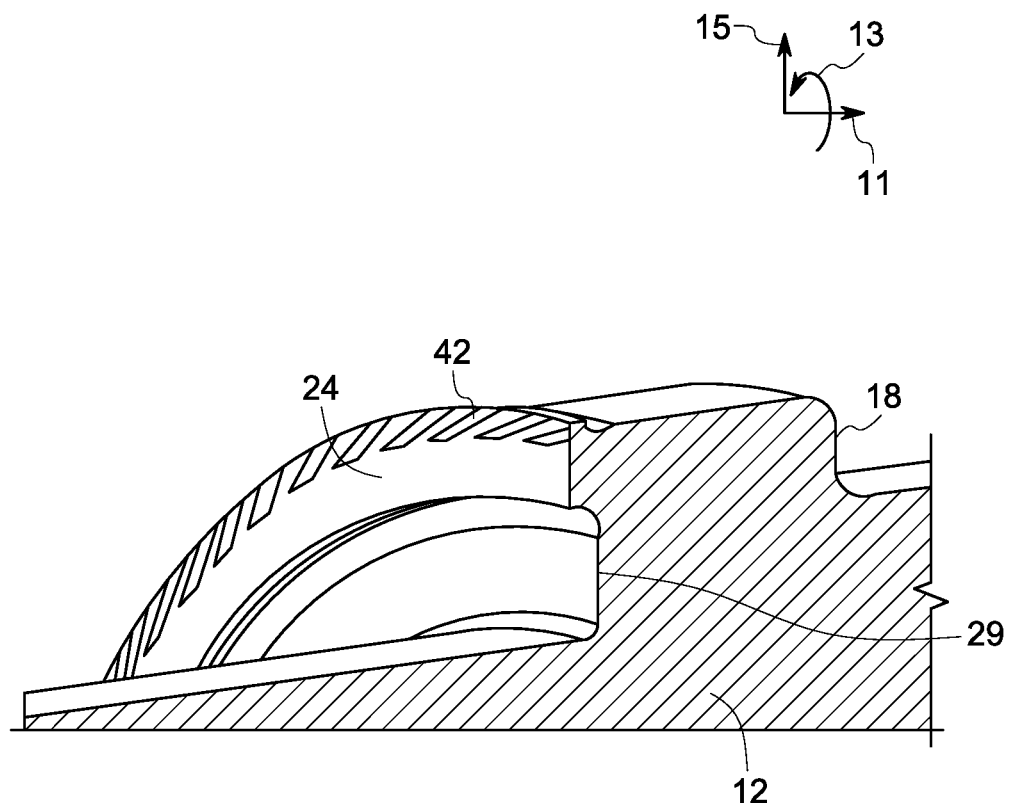
FIG. 2 is a perspective view of a portion of a rotor of FIG. 1, in accordance with aspects of the present specification.

FIG. 2 illustrates a perspective view of a portion of the rotor 12 of FIG. 1, in accordance with one aspect of the present specification. The rotor 12 includes the extended portion 29 protruding along the radial direction 15. The rotatable seal component 18 is coupled to an end portion of the extended portion 29. The rotatable seal component 18 includes the rotor bearing face 24. In some embodiments, the rotor bearing face 24 includes a plurality of hydrodynamic elements 42 disposed spaced apart from each other along the circumferential direction 13. In the illustrated embodiment, the plurality of hydrodynamic elements 42 includes spiral grooves. In some other embodiments, the plurality of hydrodynamic elements 42 may include Rayleigh steps or the like. In one or more embodiments, when the rotor 12 is rotated, the plurality of hydrodynamic elements 42 produces a fluid film (not shown) between the rotor bearing face 24 and the stator bearing face 26 (as shown in FIG. 1).

Figure 3:
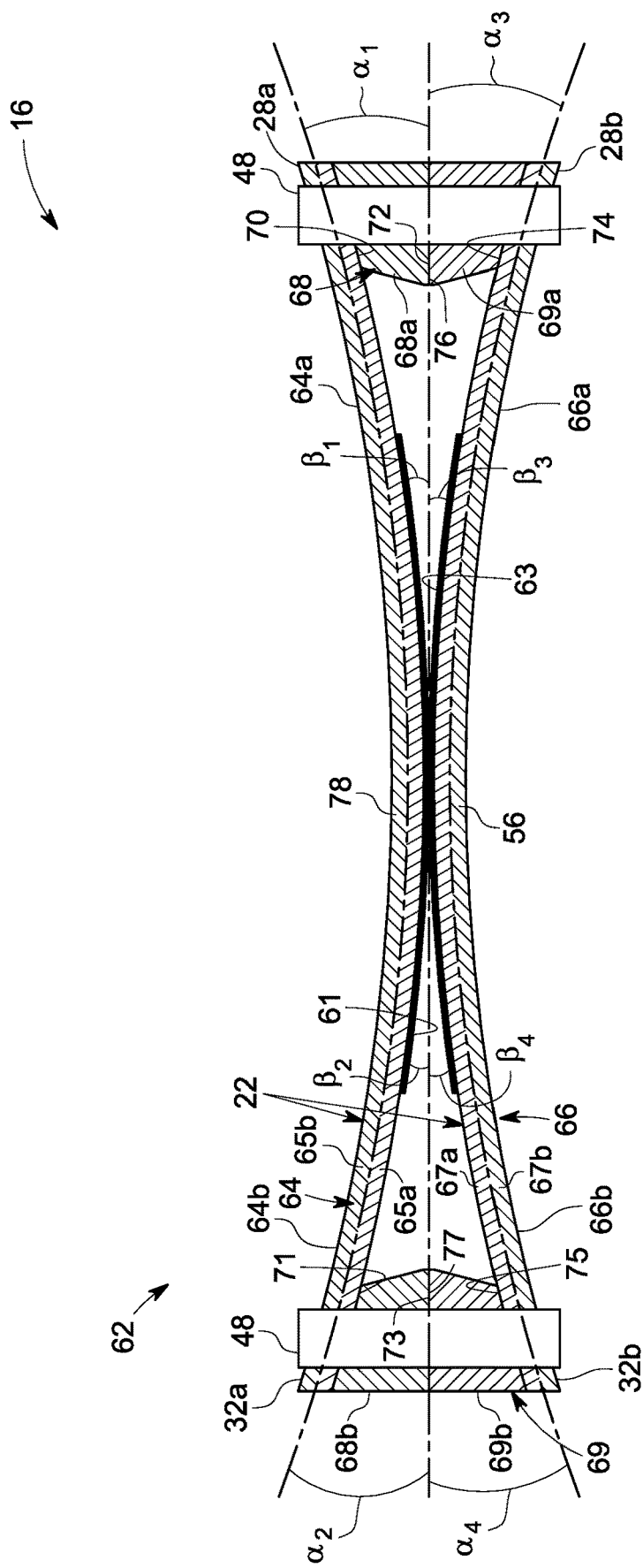
FIG. 3 is top view of a portion of a seal assembly of FIG. 1 including a first flexure and a second flexure of a plurality of pairs of flexures, in accordance with aspects of the present specification.

FIG. 3 illustrates a top view of a portion 62 of the seal assembly 16 of FIG. 1, in accordance with one embodiment of the present specification. The portion 62 of the seal assembly 16 includes one pair of flexures 22, a plurality of first wedge washers 68, a plurality of second wedge washers 69, and a plurality of fasteners 48. In certain embodiments, the pairs of flexures 22 includes the first flexure 64 and the second flexure 66. In the illustrated embodiment, each of the first and second flexures 64, 66 is a leaf spring. In one embodiment, the first flexure 64 includes two shims 65a, 65b coupled to each other. Similarly, the second flexure 66 includes two shims 67a, 67b coupled to each other.

In one embodiment, each of the plurality of first and second wedge washers 68, 69 has an inclined portion relative to a base portion. For example, a first wedge washer 68a has an inclined portion 70 and a base portion 72. The inclined portion 70 is inclined at a first angle "$\alpha_1$" relative to the base portion 72. In one embodiment, the first angle "$\alpha_1$" may be in a range from 20 degrees to 40 degrees. Similarly, a first wedge washer 68b has an inclined portion 71 and a base portion 73. The inclined portion 71 is inclined at a second angle "$\alpha_2$" relative to the base portion 73. In one embodiment, the second angle "$\alpha_2$" may be in a range from 130 degrees to 150 degrees. Further, a second wedge washer 69a has an inclined portion 74 and a base portion 76. The inclined portion 74 is inclined at a third angle "$\alpha_3$" relative to the base portion 76. In one embodiment, the third angle "$\alpha_3$" may be in a range from 310 degrees to 340 degrees. Similarly, a second wedge washer 69b has an inclined portion 75 and a base portion 77. The inclined portion 75 is inclined at a fourth angle "$\alpha_4$" relative to the base portion 77. In one embodiment, the fourth angle "$\alpha_4$" may be in a range from 210 degrees to 240 degrees.

In the illustrated embodiment, the first and second wedge washers 68a, 69a are disposed proximate to first ends 28a, 32a of the first and second flexures 64, 66 respectively. Similarly, the first and second wedge washers 68b, 69b are disposed proximate to second ends 28b, 32b of the first and second flexures 64, 66 respectively. In the illustrated embodiment, the base portion 72 of the first wedge washer 68a contacts the base portion 76 of the second wedge washer 69a. Similarly, the base portion 73 of the first wedge washer 68b contacts the base portion 77 of the second wedge washer 69b. Further, the first and second flexures 64, 66 are coupled to each other and to the non-rotatable seal component 20 (shown in FIG. 1). The first ends 28a, 32a of the first and second flexures 64, 66 are coupled to each other via a fastener of the plurality of fasteners 48 and to the non-rotatable seal component 20 via the grooved beam 30 (shown in FIG. 1). In the illustrated embodiment, each fastener of the plurality of fasteners 48 extends through a hole (not labeled) formed in the first ends 28a, 32a of the first and second flexures 64, 66 and through a hole (not labeled) formed in the first and second wedge washers 68a, 69a. Similarly, the first and second flexures 64, 66 are further coupled to each other and to a stator housing 14 via the stator adaptor 25 (shown in FIG. 1). The second ends 28b, 32b of the first and second flexures 64, 66 are coupled to each other via a fastener of the plurality of fasteners 48 and to the stator adaptor 25 via the grooved flange 34 (shown in FIG. 1). In the illustrated embodiment, each fastener of the plurality of fasteners 48 extends through a hole (not labeled) formed in the second ends 28b, 32b of the first and second flexures 64, 66 and through a hole (not labeled) formed in the first and second wedge washers 68b, 69b.

Each of the first and second flexures 64, 66 is disposed in a stressed condition such that a portion 78, for example, a central portion of the first flexure 64 contacts a portion 56, for example, a central portion of the second flexure 66. In one embodiment, a first end portion 64a of the first flexure 64 is inclined at a first angle "$\beta_1$" relative to the base portion 72 of the first wedge washer 68a. A second end portion 64b of the first flexure 64 is inclined at a second angle "$\beta_2$" relative to the base portion 73 of the first wedge washer 68b. A first end portion 66a of the second flexure 66 is inclined at a third angle "$\beta_3$" relative to the base portion 76 of the second wedge washer 69a. A second end portion 66b of the second flexure 66 is inclined at a fourth angle "$\beta_4$" relative to the base portion 77 of the second wedge washer 69b.

The first and second flexures 64, 66 are disposed in a stressed condition to increase the natural frequency and stiffness along the radial direction. Stiffness of the first and second flexures 64, 66 are reduced along the axial direction. The stressed condition of the first and second flexures 64, 66 further enables the pairs of flexures 22 to move the non-rotatable seal component along the axial direction of the machine. Further, the first and second flexures 64, 66 are used to damp the vibrations of the non-rotatable seal component and the stator housing.

In some embodiments, the plurality of first wedge washers 68 and the first flexure 64 are integrated to each other to form a first monolithic component. Similarly, the plurality of second wedge washers 69 and the second flexure 66 are integrated to each other to form a second monolithic component. The first and second monolithic components may be manufactured using additive manufacturing techniques.

In the illustrated embodiment, the portions 78, 56 of the first and second flexures 64, 66 are provided with wear resistant coatings 61, 63 respectively. In one embodiment, the portions 78, 56 correspond to the central portions of the first and second flexures 64, 66 respectively.

Figure 4:
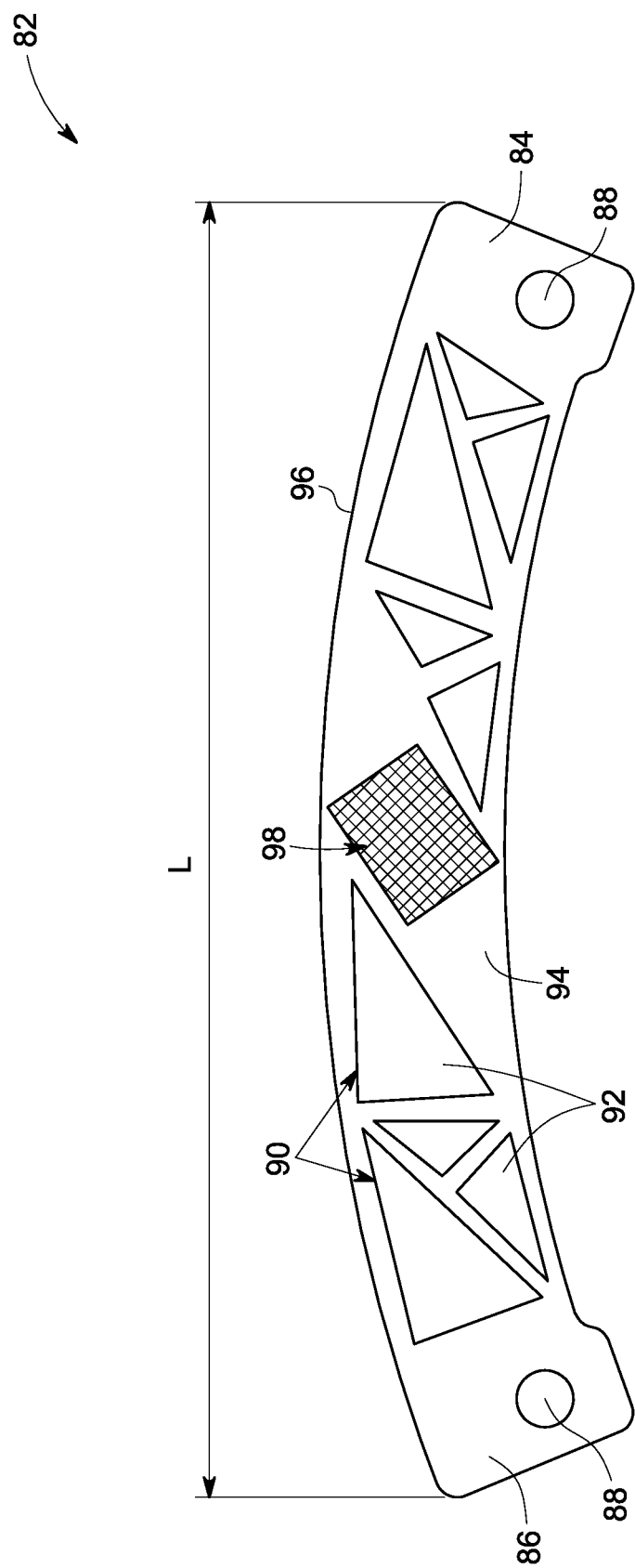
FIG. 4 is a side view of a third flexure of a plurality of third flexures, in accordance with aspects of the present specification.

FIG. 4 illustrates a side view of one third flexure 82, in accordance with one embodiment of the present specification. In the illustrated embodiment, the third flexure 82 is a leaf spring. In one embodiment, the leaf spring may include a plurality of shims coupled to each other. A first end 84 of the third flexure 82 may be coupled to the non-rotatable seal component of the seal assembly and a second end 86 of the third flexure 82 may be coupled to the stator housing of the machine. The third flexure 82 further includes a plurality of through-holes 88 formed at the first end 84 and the second end 86. The plurality of through-holes 88 may be used for inserting the fastener of the plurality of fasteners to fasten the third flexure 82 to the first and second flexures.

In the illustrated embodiment, the third flexure 82 has a truss-like structure 90 having a plurality of through-openings 92 extending from a first peripheral surface 94 to a second peripheral surface 96. The plurality of through-openings 92 may be spaced apart from each other along a longitudinal direction "L" of the third flexure 82. The truss-like structure 90 enables regulation of an axial stiffness of the third flexure 82. Further, the truss-like structure 90 enables maximization of a stiffness of the non-rotatable seal component along a radial direction of the machine relative to the stiffness of the non-rotatable seal component along an axial direction of the machine. The third flexure 82 further includes a wear resistant coating 98 disposed on a portion (e.g. central portion) of the first peripheral surface 94 and a wear resistant coating 100 (shown in FIG. 5) disposed on a portion (e.g. a central portion) of the second peripheral surface 96.

Although not illustrated, the first and second flexures 64, 66 may also have a truss-like structure 90 as discussed herein with respect to embodiment of FIG. 4. Specifically, the truss-like structure 90 maximizes the stiffness of the non-rotatable seal component along the radial direction of the machine relative to the stiffness of the non-rotatable seal component along the axial direction of the machine.

Figure 5:
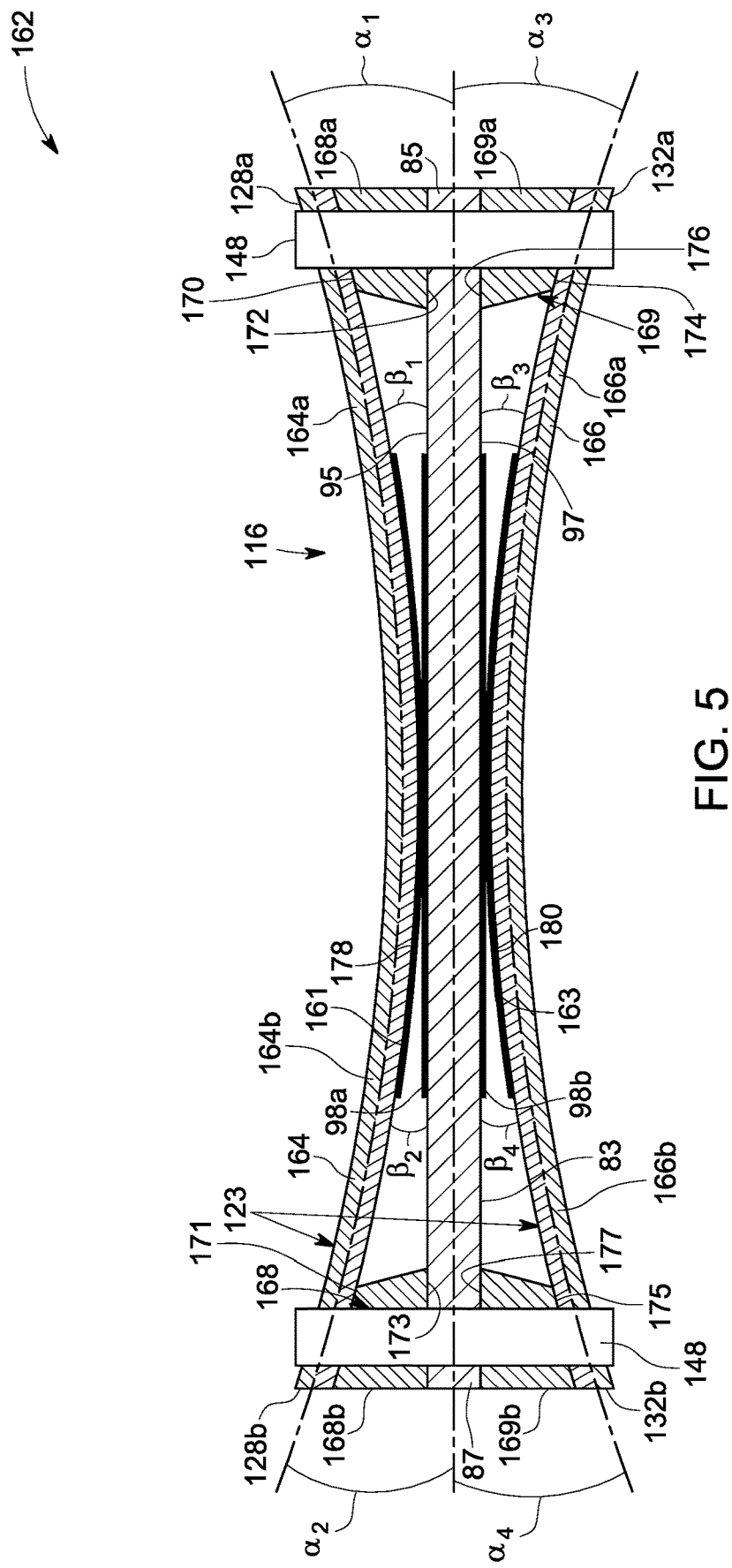
FIG. 5 is a top view of a portion of a seal assembly, in accordance with aspects of the present specification.

FIG. 5 illustrates a top view of a portion 162 of a seal assembly 116, in accordance with another embodiment of the present specification. The seal assembly 116 includes a pair of flexures 123, at least one third flexure 83, a plurality of first wedge washers 168, a plurality of second wedge washers 169, and a plurality of fasteners 148. The pair of flexures 123 includes a first flexure 164 and a second flexure 166. In the illustrated embodiment, each of the first flexure 164, the second flexure 166, and the at least one third flexure 83 is a leaf spring. In some other embodiments, the number of flexures may vary depending on the application and design criteria.

In the illustrated embodiment, the at least one third flexure 83 is disposed between the first and second flexures 164, 166. The plurality of first wedge washers 168 is disposed between the first flexure 164 and the at least one third flexure 83. The plurality of second wedge washers 169 is disposed between the second flexure 166 and the at least one third flexure 83. The plurality of first wedge washers 168 is disposed proximate to a first end 85 and a second end 87 of the at least one third flexure 83. The first flexure 164 includes a first end 128a disposed proximate to the first end 85 of the at least one third flexure 83 and a second end 128b disposed proximate to the second end 87 of the at least one third flexure 83. The second flexure 166 includes a first end 132a disposed proximate to the first end 85 of the at least one third flexure 83 and a second end 132b disposed proximate to the second end 87 of the at least one third flexure 83. The first ends 128a, 132a are coupled to each other via a fastener of the plurality of fasteners 148 extending through the plurality of first and second wedge washers 168, 169, the first and second flexures 164, 166, and the at least one third flexure 83. Similarly, the second ends 128b, 132b are coupled to each other via a fastener of the plurality of fasteners 148 extending through the plurality of first and second wedge washers 168, 169, the first and second flexures 164, 166, and the at least one third flexure 83. The first ends 128a, 132a are further coupled to the non-rotatable seal component and the second ends 128b, 132b are coupled to the stator housing.

In the illustrated embodiment, a first wedge washer 168a of the plurality of first wedge washers 168 has an inclined portion 170 and a base portion 172. The inclined portion 170 is inclined at a first angle "$\alpha_1$" relative to the base portion 172. In one embodiment, the first angle "$\alpha_1$" may be in a range from 20 degrees to 40 degrees. Similarly, a first wedge washer 168b of the plurality of first wedge washers 168 has an inclined portion 171 and a base portion 173. The inclined portion 171 is inclined at a second angle "$\alpha_2$" relative to the base portion 173. In one embodiment, the second angle "$\alpha_2$" may be in a range from 130 degrees to 150 degrees. A second wedge washer 169a of the plurality of second wedge washers 169 has an inclined portion 174 and a base portion 176. The inclined portion 174 is inclined at a third angle "$\alpha_3$" relative to the base portion 176. In one embodiment, the third angle "$\alpha_3$" may be in a range from 310 degrees to 340 degrees. Similarly, a second wedge washer 169b of the plurality of second wedge washers 169 has an inclined portion 175 and a base portion 177. The inclined portion 175 is inclined at a fourth angle "$\alpha_4$" relative to the base portion 177. In one embodiment, the fourth angle "$\alpha_4$" may be in a range from 210 degrees to 240 degrees. In the illustrated embodiment, the first wedge washers 168a, 168b are disposed proximate to the first end 85 of the at least one third flexure 83 and the second wedge washers 168b, 169b are disposed proximate to the second end 87 of the at least one third flexure 83.

In one embodiment, the first flexure 164 is disposed in a stressed condition such that a portion, for example, a central portion of a peripheral surface 178 of the first flexure 164 contacts a portion, for example, a central portion of a first peripheral surface 95 of the at least one third flexure 83. A first end portion 164a of the first flexure 164 is inclined at a first angle "$\beta_1$" relative to the first peripheral surface 95 of the at least one third flexure 83. A second end portion 164b of the first flexure 164 is inclined at a second angle "$\beta_2$" relative to the first peripheral surface 95 of the at least one third flexure 83.

The second flexure 166 is disposed in a stressed condition such that a portion, for example, a central portion of a peripheral surface 180 of the second flexure 166 contacts a portion, for example, a central portion of the second peripheral surface 97 of the at least one third flexure 83. In one embodiment, a first end portion 166a of the second flexure 166 is inclined at a third angle "$\beta_3$" relative to the second peripheral surface 97 of the at least one third flexure 83. A second end portion 166b of the second flexure 166 is inclined at a fourth angle "$\beta_4$" relative to the second peripheral surface 97 of the at least one third flexure 83.

The first and second flexures 164, 166 are disposed in the stressed condition to increase a natural frequency and stiffness along a radial direction, thereby decreasing the stiffness along an axial direction. Stacking of the first and second flexures 164, 166 in a stressed condition against the at least one third flexure 83 results in preloading the first and second flexures 164, 166 in a natural vibration mode. As a result, stiffness of the seal assembly 116 is increased along the radial direction (i.e., natural vibration mode) and stiffness of the seal assembly 116 is decreased along the axial direction. The first and second flexures 164, 166 enable the damping of the vibrations of the non-rotatable seal component and the stator housing. Portions, for example, the central portions of the first and second flexures 164, 166 are provided with wear resistant coatings 161, 163 respectively. Similarly, the portion, e.g. central portion of the first peripheral surface 95 of the at least one third flexure 83 and the portion, e.g. central portion of the second peripheral surface 97 of the at least one third flexure 83 are provided with wear resistant coatings 98a, 98b respectively. The portion of the first flexure 164 rubs against the portion of the first peripheral surface 95 of the at least one third flexure 83 and the portion of the second flexure 166 rubs against the portion of the second peripheral surface 97 of the at least one third flexure 83, resulting in dissipation of heat from the non-rotatable seal component to the stator housing.

FIG. 6 is a top view of a portion 262 of a seal assembly 216, in accordance with yet another embodiment of the present specification. In one embodiment, the seal assembly 216 includes a pair of flexures 223, a plurality of third flexures 282, a plurality of first wedge washers 268, a plurality of second wedge washers 269, and a plurality of fasteners 248. The pair of flexures 223 includes a first flexure 264 and a second flexure 266. In the illustrated embodiment, each of the first and second flexures 264, 266 is a leaf spring and each of the plurality of third flexures 282 is a W-shaped spring. First ends 228a, 232a of the first flexure 264 and the second flexure 266 respectively are coupled to each other via a fastener of the plurality of fasteners 248 extending through the plurality of first and second wedge washers 268, 269 and through the first and second flexures 264, 266. Similarly, second ends 228b, 232b of the first flexure 264 and the second flexure 266 respectively are coupled to each other via a fastener of the plurality of fasteners 248 extending through the plurality of first and second wedge washers 268, 269 and through the first and second flexures 264, 266. The first ends 228a, 232a are further coupled to the non-rotatable seal component and the second ends 228b, 232b are coupled to the stator housing.

In the illustrated embodiment, the plurality of third flexures 282 is disposed between the first and second flexures 264, 266. The first and second flexures 264, 266 are disposed in a stressed condition such that a portion of each of the first and second flexures 264, 266 are in contact with each other via the plurality of third flexures 282. In the illustrated embodiment, a first end 284 of one third flexure 282a is coupled to the first flexure 264 and a second end 286 of the third flexure 282a is coupled to a bump or an enclosure 288 coupled to the second flexure 266. The seal assembly 216 is used to damp vibrations of the non-rotatable seal component and the stator housing by biasing the first and second flexures 264, 266 against each other via the plurality of third flexures 282.

FIG. 7 is a top view of a portion 362 of a seal assembly 316, in accordance with yet another embodiment of the present specification. The seal assembly 316 includes a pair of flexures 323, a plurality of third flexures 382, a plurality of first wedge washers 368, a plurality of second wedge washers 369, and a plurality of fasteners 348. The pair of flexures 323 includes a first flexure 364 and a second flexure 366. In the illustrated embodiment, each of the first and second flexures 364, 366 is a leaf spring and each of the plurality of third flexures 382 is a V-shaped spring. Moreover, in the illustrated embodiment, the plurality of third flexures 382 is disposed between the first and second flexures 364, 366. The first and second flexures 364, 366 are disposed in a stressed condition such that a portion of each of the first and second flexures 364, 366 are in contact with each other via the plurality of third flexures 382. In the illustrated embodiment, a first end 384 of one third flexure 382a is coupled to the first flexure 364 and a second end 386 of the one third flexure 382a is coupled to a bump or an enclosure 388 coupled to the second flexure 366. The seal assembly 316 is used to damp vibrations of the non-rotatable seal component and the stator housing by biasing the first and second flexures 364, 366 against each other via the plurality of third flexures 382.

Figure 8:
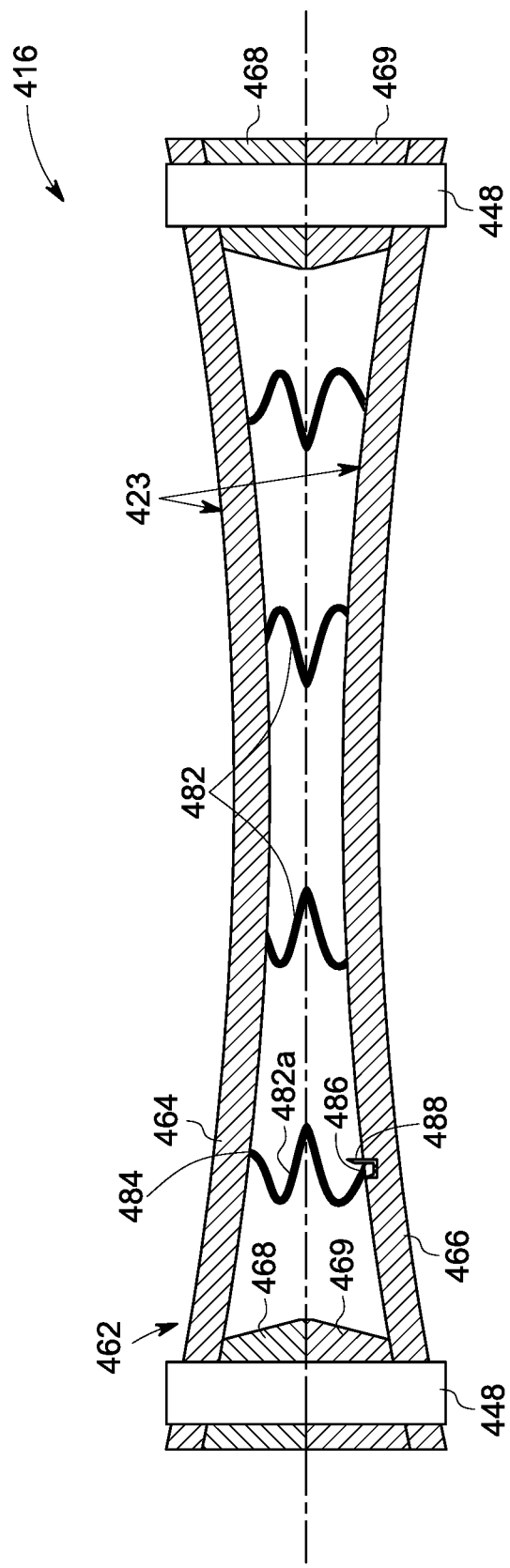
FIG. 8 is a top view of a portion of a seal assembly, in accordance with aspects of the present specification.

FIG. 8 is a top view of a portion 462 of a seal assembly 416 in accordance with yet another embodiment of the present specification. The seal assembly 416 includes a pair of flexures 423, a plurality of third flexures 482, a plurality of first wedge washers 468, a plurality of second wedge washers 469, and a plurality of fasteners 448. The pair of flexures 423 includes a first flexure 464 and a second flexure 466. In the illustrated embodiment, each of the first and second flexures 464, 466 is a leaf spring and each of the plurality of third flexures 482 is a bellow spring. In the illustrated embodiment, the plurality of third flexures 482 is disposed between the first and second flexures 464, 466. The first and second flexures 464, 466 are disposed in a stressed condition such that a portion of each of the first and second flexures 464, 466 are in contact with each other via the plurality of third flexures 482. In the illustrated embodiment, a first end 484 of one third flexure 482a is coupled to the first flexure 464 and a second end 486 of the one third flexure 482a is coupled to a bump or an enclosure 488 coupled to the second flexure 466. The seal assembly 416 is used to damp vibrations of the non-rotatable seal component and the stator housing by biasing the first and second flexures 464, 466 against each other via the plurality of third flexures 482.

Figure 9:
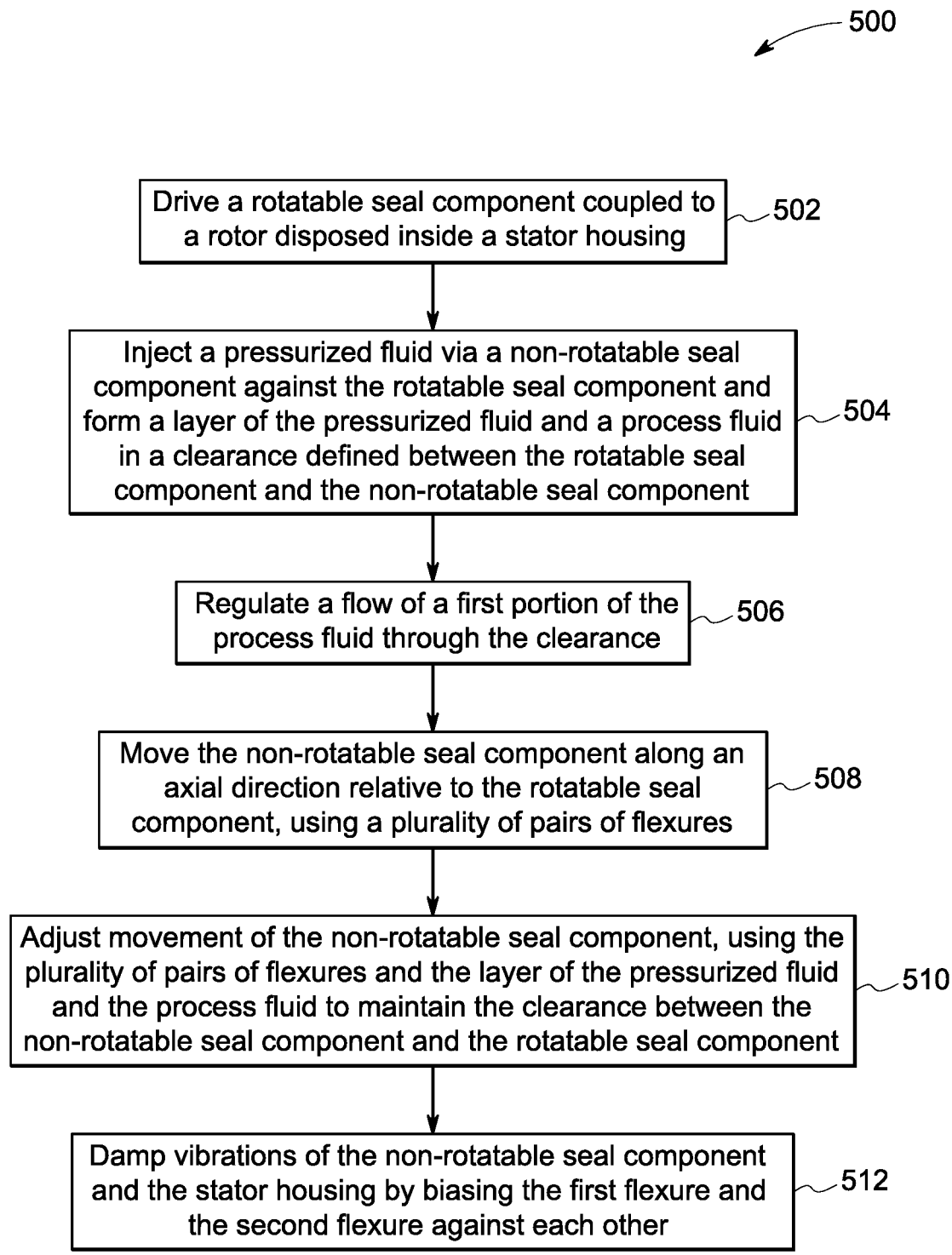
FIG. 9 is a flow chart illustrating a method of operating a seal assembly, in accordance with aspects of the present specification.

FIG. 9 is a flow chart illustrating a method 500 of operating a seal assembly, in accordance with aspects of the present specification. In one embodiment, the method 500 includes a step 502 of driving a rotatable seal component coupled to a rotor disposed inside a stator housing. In some embodiments, the rotation of the rotor may cause a plurality of hydrodynamic elements formed in a rotor bearing face of the rotatable seal component to form a thin film of a process fluid along a clearance defined between the non-rotatable seal component and the rotatable seal component. Further, the method 500 includes a step 504 of injecting a pressurized fluid via a non-rotatable seal component against the rotatable seal component and forming a layer (i.e., a thick film) of the pressurized fluid and the process fluid along the clearance. In some embodiments, steps 502 and 504 are performed sequentially. In some other embodiments, steps 502 and 504 are performed simultaneously. In one embodiment, the step 504 of injecting the pressurized fluid may be performed before the step 502 of driving a rotatable seal component.

The method 500 further includes a step 506 of regulating a flow of a portion of the process fluid through the clearance by the film. The method 500 further includes a step 508 of moving the non-rotatable seal component along an axial direction relative to the rotatable seal component, using a plurality of pairs of flexures. In some embodiments, the plurality of pairs of flexures exerts either an opening force or a closing force on the non-rotatable seal component to move the non-rotatable seal component along a first axial direction or a second axial direction opposite to the first axial direction relative to the rotatable seal component. The method further includes a step 510 of adjusting a movement of the non-rotatable seal component, using the plurality of pairs of flexures to maintain the clearance between the non-rotatable seal component the rotatable seal component. Such a movement of the non-rotatable seal component enables the seal assembly to track an axial movement of the rotor such that the non-rotatable seal component does not contact the rotatable seal component. Further, the method 500 includes a step 512 of damping vibrations of the non-rotatable seal component and the stator housing by biasing a first flexure and a second flexure of each pair of the plurality of pairs of flexures against each other. In one embodiment, at least one flexure of the first flexure, the second flexure, and the at least one third flexure is a leaf spring. In another embodiment, one flexure of the plurality of third flexures is at least one of a bellow spring, a W-shaped spring, and a V-shaped spring.

In accordance with certain embodiments discussed herein, the exemplary damped biasing member (a plurality of pairs of flexures and/or at least one third flexure) for a seal assembly provides a large span for an axial motion of a non-rotatable seal component while limiting a radial motion of the non-rotatable seal component. Further, the damped biasing member aids in attenuating vibrations generated by a machine. In addition, the plurality of pairs of flexures and/or the at least one third flexure enable heat dissipation from the seal assembly.

While only certain features of embodiments have been illustrated and described herein, many modifications and changes will occur to those skilled in the art. It is, therefore, to be understood that the appended embodiments are intended to cover all such modifications and changes as falling within the spirit of the disclosed technique.

The invention claimed is:

1. A seal assembly comprising:
    a rotatable seal component;
    a non-rotatable seal component disposed facing the rotatable seal component;
    a plurality of pairs of flexures spaced apart from each other along a circumferential direction of the seal assembly, wherein each pair of the plurality of pairs of flexures comprises a first flexure and a second flexure disposed in a stressed condition such that a portion of the first flexure and a portion of the second flexure are in contact with each other, and wherein an end of the first flexure and an end of the second flexure are coupled to each other and to the non-rotatable seal component;
    a plurality of third flexures, wherein at least one third flexure of the plurality of third flexures is disposed between the first and second flexures;
    a plurality of first wedge washers;
    a plurality of second wedge washers; and
    a plurality of fasteners,
    wherein the plurality of first wedge washers is disposed between the first flexure and the at least one third flexure, wherein the plurality of second wedge washers is disposed between the second flexure and the at least one third flexure, and wherein the first flexure and the second flexure are coupled to each other via the plurality of fasteners extending through the plurality of first and second wedge washers and the at least one third flexure.

2. The seal assembly of claim 1, wherein the plurality of first wedge washers and the first flexure are integrated with each other, and wherein the plurality of second wedge washers and the second flexure are integrated with each other.

3. The seal assembly of claim 1, wherein the portion of the first flexure contacts a portion of a first peripheral surface of the at least one third flexure and the portion of the second flexure contacts a portion of a second peripheral surface of the at least one third flexure.

4. The seal assembly of claim 3, wherein at least one of the portion of the first peripheral surface and the portion of the second peripheral surface comprises a wear resistant coating.

5. The seal assembly of claim 3, wherein at least one of the portion of the first flexure and the portion of the second flexure comprises a wear resistant coating.

6. The seal assembly of claim 3, wherein at least one of the first and second flexures and the at least one third flexure comprises a leaf spring.

7. The seal assembly of claim 6, wherein the leaf spring comprises one or more shims that are in contact with each other.

8. The seal assembly of claim 6, wherein at least one of the first and second flexures and the at least one third flexure comprises a truss-like structure.

9. The seal assembly of claim 1, wherein the at least one third flexure comprises a first end and a second end, and wherein one of the first and second ends is coupled to the first or second flexure.

10. The seal assembly of claim 9, wherein at least one of the first and second flexures comprises a leaf spring, and wherein the at least one third flexure comprises at least one of a bellow spring, a W-shaped spring, and a V-shaped spring.

11. A machine comprising:
    a stator housing;
    a rotor disposed in the stator housing;
    a seal assembly disposed between the stator housing and the rotor, wherein the seal assembly comprises:
        a rotatable seal component coupled to the rotor;
        a non-rotatable seal component disposed facing the rotatable seal component;
        a plurality of pairs of flexures disposed spaced apart from each other along a circumferential direction of the seal assembly, wherein each pair of the plurality of pairs of flexures comprises a first flexure and a second flexure disposed in a stressed condition such that a portion of the first flexure and a portion of the second flexure are in contact with each other, wherein a first end of the first flexure and a first end of the second flexure are coupled to each other and to the non-rotatable seal component, and wherein a second end of the first flexure and a second end of the second flexure are coupled to each other and to the stator housing;

a plurality of third flexures, wherein at least one third flexure of the plurality of third flexures is disposed between the first and second flexures;

a plurality of first wedge washers;

a plurality of second wedge washers; and a plurality of fasteners, wherein the plurality of first wedge washers is disposed between the first flexure and the at least one third flexure, wherein the plurality of second wedge washers is disposed between the second flexure and the at least one third flexure, and wherein the first flexure and the second flexure are coupled to each other via the plurality of fasteners extending through the plurality of first and second wedge washers and the at least one third flexure.

12. The machine of claim 11, wherein the plurality of first wedge washers and the first flexure are integrated with each other, and wherein the plurality of second wedge washers and the second flexure are integrated with each other.

13. The machine of claim 12, wherein the portion of the first flexure contacts a portion of a first peripheral surface of the at least one third flexure and the portion of the second flexure contacts a portion of a second peripheral surface of the at least one third flexure.

14. The machine of claim 13, wherein at least one of the portion of the first peripheral surface and the portion of the second peripheral surface comprises a wear resistant coating, and wherein at least one of the portion of the first flexure and the portion of the second flexure comprises a wear resistant coating.

15. The machine of claim 14, wherein at least one of first and second flexures, and the at least one third flexure comprises a truss-like structure.

16. The machine of claim 11, wherein the at least one third flexure comprises a first end and a second end, and wherein one of the first and second ends is coupled to the first or second flexure.

17. The machine of claim 16, wherein at least one of the first and second flexures comprises a leaf spring comprising a plurality of shims that contact each other, and wherein the at least one third flexure comprises at least one of a bellow spring, a W-shaped spring, and a V-shaped spring.

18. A method comprising:

driving a rotatable seal component coupled to a rotor disposed inside a stator housing;

injecting a pressurized fluid via a non-rotatable seal component against the rotatable seal component and forming a layer of the pressurized fluid and a process fluid in a clearance defined between the rotatable seal component and the non-rotatable seal component;

regulating a flow of a portion of the process fluid through the clearance;

moving the non-rotatable seal component along an axial direction relative to the rotatable seal component, using a plurality of pairs of flexures, wherein each pair of the plurality of pairs of flexures comprises a first flexure and a second flexure disposed in a stressed condition such that a portion of the first flexure and a portion of the second flexure are in contact with each other, and wherein a first end of the first flexure and a first end of the second flexure are coupled to each other and to the non-rotatable seal component, and a second end of the first flexure and a second end of the second flexure are coupled to each other and to the stator housing;

adjusting movement of the non-rotatable seal component, using the plurality of pairs of flexures and the layer of the pressurized fluid and the process fluid to maintain the clearance between the non-rotatable seal component and the rotatable seal component; and damping vibrations of the non-rotatable seal component and the stator housing by biasing the first flexure and the second flexure against each other.

19. The method of claim 18, wherein damping vibrations of the non-rotatable seal component and the stator housing further comprises biasing the first and second flexures against at least one third flexure of a plurality of third flexures, and wherein the at least one third flexure of the plurality of third flexures is disposed between the first and second flexures.

20. The method of claim 19, further comprising dissipating heat from the non-rotatable seal component due to rubbing the portion of the first flexure against a portion of a first peripheral surface of the at least one third flexure and the portion of the second flexure against a portion of a second peripheral surface of the at least one third flexure.

* * * * *